(12) United States Patent
Lee

(10) Patent No.: US 10,870,478 B2
(45) Date of Patent: Dec. 22, 2020

(54) DRONE CAPABLE OF VARYING PROPELLER ARRANGEMENT SHAPE

(71) Applicant: Korea Aerospace Research Institute, Yuseong-gu Daejeon (KR)

(72) Inventor: Seon Ho Lee, Yuseong-gu Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 464 days.

(21) Appl. No.: 15/752,848

(22) PCT Filed: Aug. 26, 2016

(86) PCT No.: PCT/KR2016/009473
§ 371 (c)(1),
(2) Date: Feb. 14, 2018

(87) PCT Pub. No.: WO2017/039233
PCT Pub. Date: Mar. 9, 2017

(65) Prior Publication Data
US 2018/0244363 A1 Aug. 30, 2018

(30) Foreign Application Priority Data

Sep. 1, 2015 (KR) .................. 10-2015-0123582

(51) Int. Cl.
*B64C 1/06* (2006.01)
*B64C 27/08* (2006.01)
(Continued)

(52) U.S. Cl.
CPC ............. *B64C 1/063* (2013.01); *B64C 1/30* (2013.01); *B64C 27/006* (2013.01); *B64C 27/08* (2013.01);
(Continued)

(58) Field of Classification Search
CPC ......... B64C 1/063; B64C 1/30; B64C 27/006; B64C 27/08; B64C 39/02; B64C 39/024
See application file for complete search history.

(56) References Cited

U.S. PATENT DOCUMENTS 8,292,215 B2 * 10/2012 Olm ..................... B64C 39/024
244/17.23
8,946,607 B2 2/2015 Gettinger
(Continued)

FOREIGN PATENT DOCUMENTS

CN 102627145 * 8/2012
CN 102627145 A 8/2012
(Continued)

OTHER PUBLICATIONS

EPO Extended Search Report dated Feb. 1, 2019, in related PCT/KR2016009473 patent application.
(Continued)

*Primary Examiner* — Justin M Benedik
(74) *Attorney, Agent, or Firm* — Downs Rachlin Martin PLLC

(57) ABSTRACT

A drone having a deployment device, which is configured such that the same can fly both in a folded mode and in a deployed mode. A platform 300 is arranged in the middle of the drone body 400, a deployment device 200 is arranged on the radial outer side of the platform 300, a fixed support table 230 extends outwardly from the radial outer surface of the platform 300, a rotating support table 210 is coupled to an outer free end of the fixed support table 230, and the rotating support table 210 is rotatably coupled to/supported on the outer free end of the fixed support table 230. Multiple propellers 100 are mounted on the radial outer ends of the
(Continued)

rotating support table 210, respectively, a landing structure 600 is coupled to the body 400, and a holder 500 is mounted on the landing structure 600.

20 Claims, 12 Drawing Sheets

(51) Int. Cl.
*B64C 39/02* (2006.01)
*B64C 1/30* (2006.01)
*B64C 27/00* (2006.01)

(52) U.S. Cl.
CPC ............ *B64C 39/02* (2013.01); *B64C 39/024* (2013.01); *B64C 2201/024* (2013.01); *B64C 2201/027* (2013.01); *B64C 2201/108* (2013.01); *B64C 2201/128* (2013.01); *B64C 2201/165* (2013.01)

(56) References Cited

U.S. PATENT DOCUMENTS

| 2009/0008499 A1* | 1/2009 | Shaw | B64C 27/08 244/17.23 |
| 2010/0264260 A1 | 10/2010 | Hammerquist | |
| 2013/0214088 A1* | 8/2013 | Shachor | B64C 39/022 244/17.17 |
| 2014/0339355 A1* | 11/2014 | Olm | B64C 27/08 244/17.23 |
| 2016/0159472 A1* | 6/2016 | Chan | B64C 27/37 244/39 |

FOREIGN PATENT DOCUMENTS

| CN | 103625641 A | 3/2014 |
| CN | 104085530 A | 10/2014 |
| CN | 104260878 A | 1/2015 |
| CN | 104401484 A | 3/2015 |
| CN | 204507252 U | 7/2015 |
| CN | 104859836 A | 8/2015 |
| KR | 10-1461059 B1 | 11/2014 |
| KR | 10-1522516 B1 | 5/2015 |
| KR | 10-1527544 B1 | 6/2015 |
| KR | 10-2015-0075587 A | 7/2015 |
| WO | 2016089882 A1 | 6/2016 |

OTHER PUBLICATIONS

International Search Report dated Nov. 28, 2016, in International Patent Application No. PCT/KR2016/009473, filed on Aug. 26, 2016.

\* cited by examiner

<Shape in folded mode>

<Shape in deployed mode>

<Shape in folded mode>

<Shape in deployed mode>

Failure occurring

Failure recovered

DRONE CAPABLE OF VARYING PROPELLER ARRANGEMENT SHAPE

TECHNICAL FIELD

Example embodiments relate to a drone, and more particularly, to a drone including a deployment device that enables the drone to fly both in a folded mode and a deployed mode and vary an arrangement shape of propellers of the drone.

BACKGROUND ART

In general, a drone refers to an unmanned aerial vehicle that is provided in a shape of an aircraft or a helicopter and used for military purposes, and flies or steers through induction of radio waves without a pilot or an operator. A drone was initially used as a target, in place of an enemy aircraft, in firing or shooting practices of air-force planes or anti-aircrafts, and it is currently used for various purposes, for example, for reconnaissance and surveillance, and anti-submarine attacks. In addition, around the year of 2010, it has become widely used for various civilian purposes in addition to the military purposes. For example, it is used to capture an image of a location, for example, a volcanic crater, where human beings cannot go themselves, and also commercially used for an unmanned delivery service provided by online shopping malls to deliver a lightweight parcel to a consumer by applying a global positioning system (GPS) thereto.

As research is actively conducted to commercialize drones, various attempts are also being made to improve performance of the drones. For example, research has been conducted to improve an arrangement structure of a body and propellers of a drone in order to improve flight stability of the drone. As known in related fields of the art, when a length of a support that connects a body and propellers of a drone increases, an inertial moment of the entire drone may increase, and posture stability against disturbance may also increase. In addition, as illustrated in FIG. 9, when a length L of a support increases, a torque relative to a floating force F of a propeller, for example, $T=L \times F$, may increase by a leverage principle, and thus rotation and mobility of a drone may also be improved.

However, when the length L of the support increases, an entire volume of the drone may also increase, and thus a greater space may be needed to store a large number of drones. In addition, there may be an increasing risk of damage or breakage due to an external impact when the drone moves or is carried around.

DISCLOSURE OF INVENTION

Technical Goals

Example embodiments provide a drone including a deployment device that enables the drone to fly both in a folded mode and a deployed mode and vary or change an arrangement shape of propellers thereof.

Example embodiments also provide a drone that differently adjusts a deployment angle of propellers that normally operate in a deployed mode to maintain a posture balance and also flight stability of the drone.

Technical Solutions

According to an example embodiment, there is provided a drone including a body, a platform disposed at a center of the body, a deployment device disposed radially on an outer side of the platform—the deployment device including a fixed support extended outwards radially from an outer surface of the platform by a predetermined length, a rotating support coupled to an outer free end of the fixed support, and a hinge device provided to support the rotating support to be rotatably coupled to the outer free end of the fixed support—a plurality of propellers each fixed radially at an outer end of the rotating support, and a landing structure integrally coupled to a lower portion of the body.

The hinge device may include a hinge and a spring portion. The spring portion may be disposed radially on an outer surface of the hinge to cover the hinge, and one end of the spring portion may be fixed to the fixed support and an other end thereof may be fixed to the rotating support.

A locking unit may be provided on an upper surface and/or a lower surface of the platform, and may lock or release the propellers.

According to another example embodiment, there is provided a drone including a body, a platform disposed at a center of the body, a deployment device disposed radially on an outer side of the platform—the deployment device including a fixed support extended outwards radially from an outer surface of the platform by a predetermined length, a rotating support coupled to an outer free end of the fixed support, and a motor provided to support the rotating support to be rotatably coupled to the outer free end of the fixed support—a plurality of propellers each fixed radially at an outer end of the rotating support, and a landing structure integrally coupled to a lower portion of the body.

The motor may be disposed at the outer free end of the fixed support, and a free end of a motor shaft extended upwards or downwards from the motor may be coupled to one end of the rotating support.

More desirably, a slip ring may be provided between the motor shaft and the one end of the rotating support.

Advantageous Effects

According to example embodiments described herein, a deployment device including a rotating support, a hinge device or a motor, and a fixed support may be provided between a platform and propellers of a drone, and thus the drone may operate both in a folded mode and a deployed mode of the propellers. In addition, because the propellers are not deployed or unfolded in the folded mode, a volume of the drone may be minimized, and thus it may be convenient to store and carry the drone around. Further, the drone may also fly without baggage. In the deployed mode, an inertia moment and a torque of the drone may be readjusted while some or all of the propellers are being deployed, and thus the drone may fly irrespective of embarkation of baggage. Also, in the deployed mode, a deployment angle may be differently applied to each of the propellers, and thus the inertia moment and the torque may be adjusted differently based on each of a roll axis, a pitch axis, and a yaw axis of the drone. Further, although a portion of the propellers is broken, or a failure occurs in a portion of the propellers, it is still possible to maintain a posture balance of the drone by differently adjusting a deployment angle of a propeller that operates normally among the propellers.

BEST MODE FOR CARRYING OUT THE INVENTION

Figure 1:
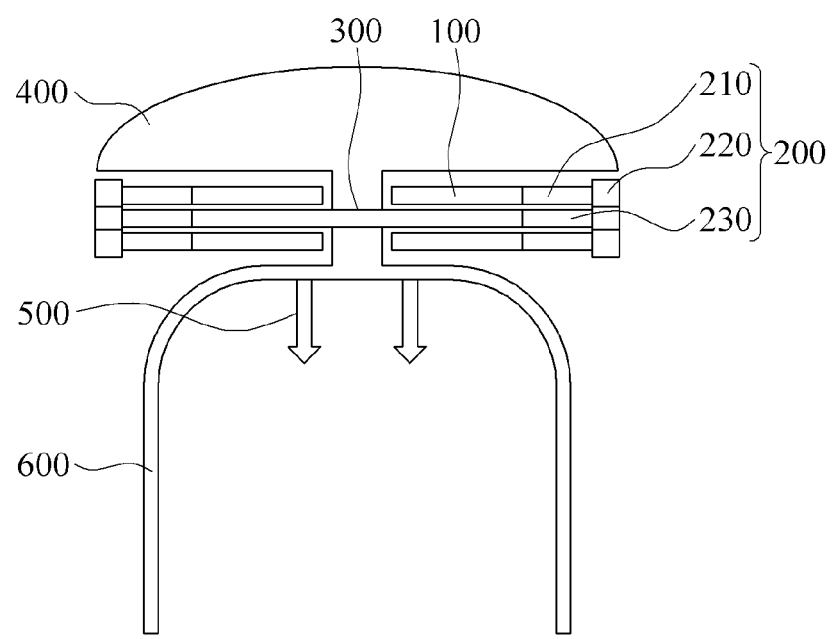
FIG. 1 is a diagram illustrating an example of a structure of a drone according to an example embodiment.

Reference will now be made in detail to example embodiments, examples of which are illustrated in the accompanying drawings, wherein like reference numerals refer to the like elements throughout.

Figure 2:
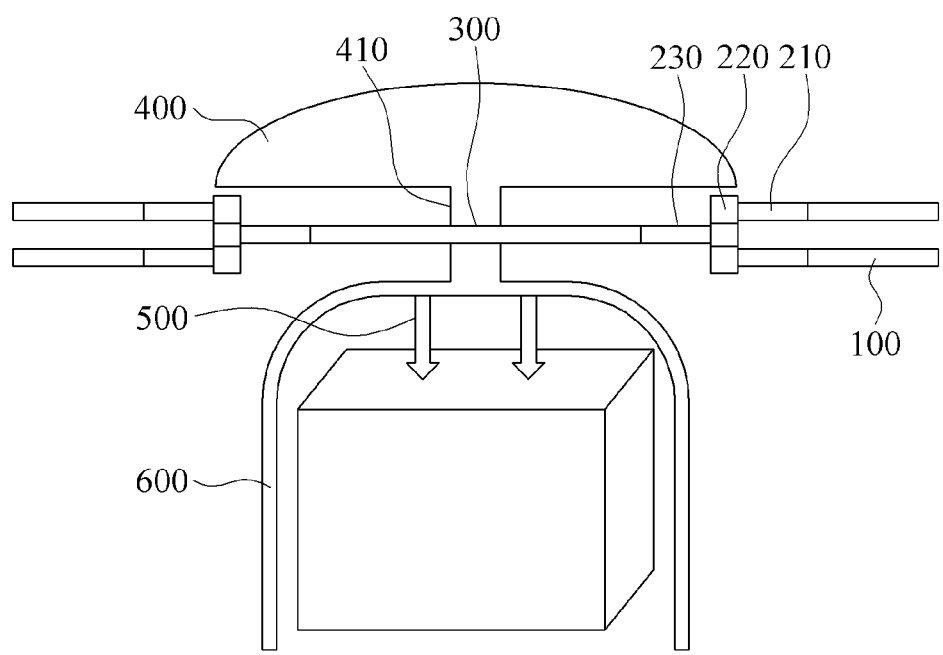
FIG. 2 is a diagram illustrating an overall shape of the drone of FIG. 1 in a deployed mode.

FIGS. 1 and 2 are diagrams illustrating an example of a structure of a drone according to an example embodiment.

Referring to FIGS. 1 and 2, according to an example embodiment, a drone includes a plurality of propellers 100, a deployment device 200, a platform 300, a body 400, a holder 500, and a landing structure 600. The holder 500 is integrally disposed on an inner lower surface of the landing structure 600.

The body 400 has an upper surface curved in a predetermined shape for an appearance, and a vertical body extension 410 is formed between a lower center of the body 400 and an upper portion of the landing structure 600. The platform 300 of a disc shape is fixedly disposed on the body extension 410. The deployment device 200 is disposed radially on an outer side of the platform 300 that is disposed horizontally in a middle of the body 400.

The deployment device 200 includes a rotating support 210, a hinge device 220, and a fixed support 230. The fixed support 230 is extended outwards radially from an outer surface of the platform 300 by a predetermined length, and extended to form a radial symmetry based on a center of the platform 300 for an operation stability and balance of the drone. More desirably, eight fixed supports may be provided as the fixed support 230 and extended outwards radially from the outer surface of the platform 300 by the predetermined length, and an angle therebetween with respect to the center of the platform 300 is 45 degrees (°). Although an octo-rotor is provided herein as an example thereof for convenience of description, it is readily understood by those having ordinary skill in the art that various types of unmanned aerial vehicles, for example, a tri-rotor, a quad-rotor, a penta-rotor, a hexa-rotor, and an octo-rotor, may be embodied irrespective of the number and configuration of propellers.

Figure 3A:
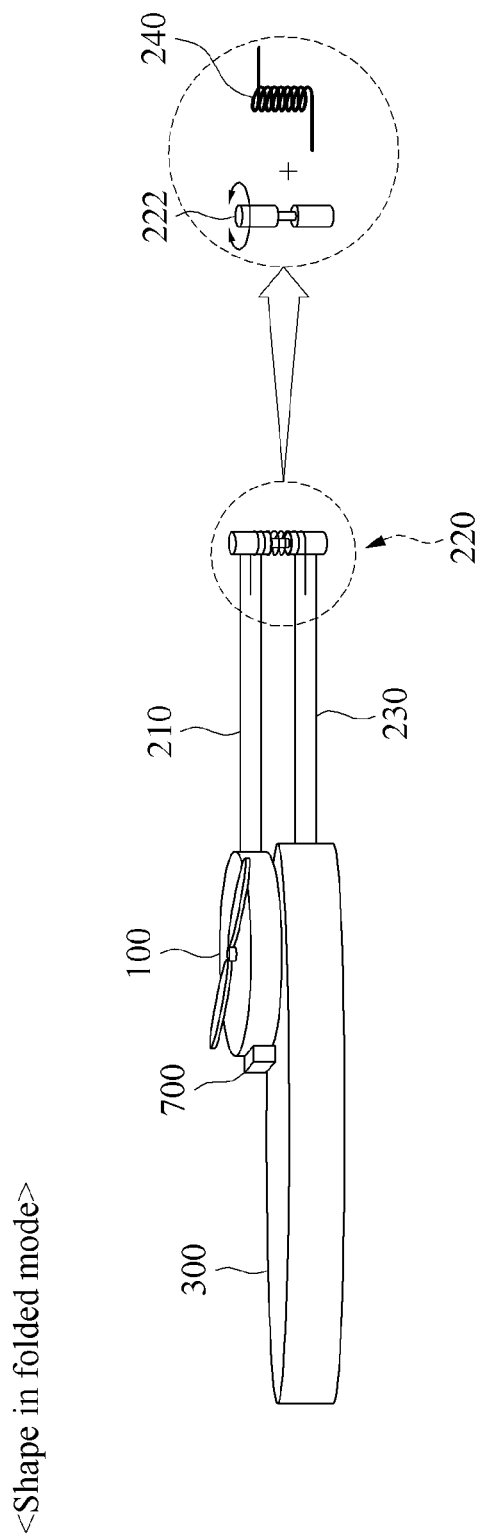
FIGS. 3a and 3b are diagrams illustrating examples of a joint hinge of the drone of FIG. 1 in a folded mode and a deployed mode, respectively, to which a spring portion and a locking unit are applied.
Figure 3B:
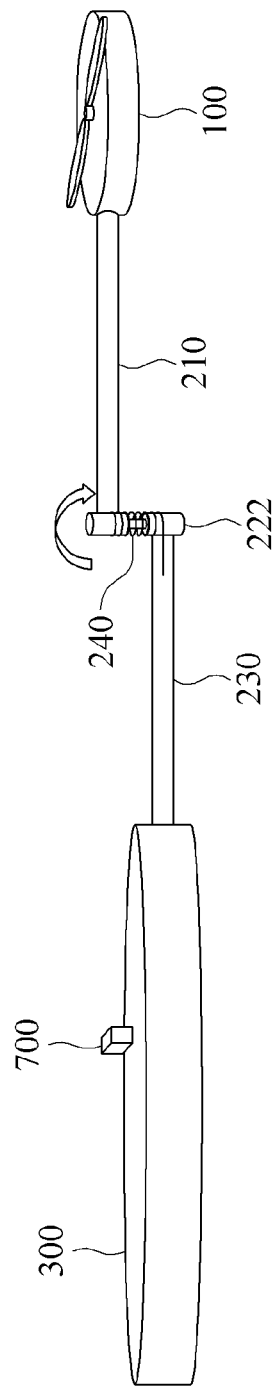

The rotating support 210 is rotatably coupled to an outer free end of the fixed support 230 by the hinge device 220. The hinge device 220 may be embodied variously as needed, and thus the hinge device 220 may be configured as a single hinge device or a plurality of hinge devices. In such a case, it is readily understood by those having ordinary skill in the art that the number of the rotating support 210 may also increase proportionally. FIGS. 3a and 3b illustrate an example of the hinge device 220 to which a hinge 222 and a spring portion 240 are applied.

Referring to FIGS. 3a and 3b, the hinge device 220 includes the hinge 222 and the spring portion 240 for automatic deployment. As illustrated, the spring portion 240 is disposed radially on an outer surface of the hinge 222 to cover the hinge 222. One end of the spring portion 240 is fixed to the fixed support 230, and the other end of the spring portion 240 is fixed to the rotating support 210. Through such a structure, a radial inner end of the rotating support 210 is rotatably supported at an outer free end of the fixed support 230 by the hinge device 220. The propellers 100 are fixedly provided radially at an outer end of the rotating support 210.

A locking unit 700 is provided where the propellers 100 are folded in a folded mode of the drone and disposed on an upper surface and/or a lower surface of the platform 300. The locking unit 700 locks or releases the propellers 100 when the propellers 100 are folded in the folded mode of the drone and then disposed on the upper surface and/or the lower surface of the platform 300. The locking unit 700 may include a release unit configured to release a lock directly by a user or release a lock state using an anti-torque that is generated when the propellers 100 are rotated.

The locking unit 700 may be embodied mechanically or electronically based on a locking and/or releasing method. A mechanical locking unit may perform such locking or releasing by allowing a user to manually turn on or off a switch, whereas an electronic locking unit may automatically perform such locking or releasing based on an electrical signal transmitted from the body 400. An example of such an electronic locking unit includes an electronic door lock installed on a front door of an apartment.

When a user releases the locking unit 700, the propellers 100 may be deployed or unfolded by a restoring force, or resilience, of the spring portion 240. When the user inversely applies a force greater than the restoring force of the spring portion 240, an operation mode of the drone may change from a deployed mode to the folded mode.

Figure 4A:
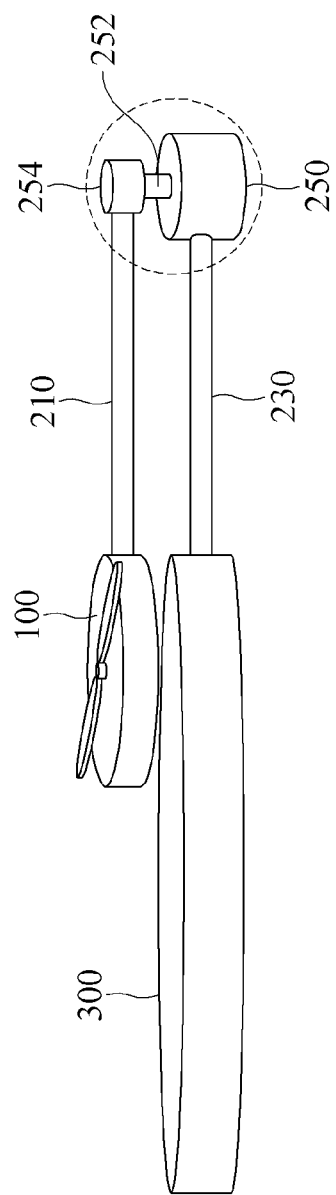
FIGS. 4a and 4b are diagrams illustrating examples of a joint hinge of the drone of FIG. 1 in a folded mode and a deployed mode, respectively, to which a motor is applied.
Figure 4B:
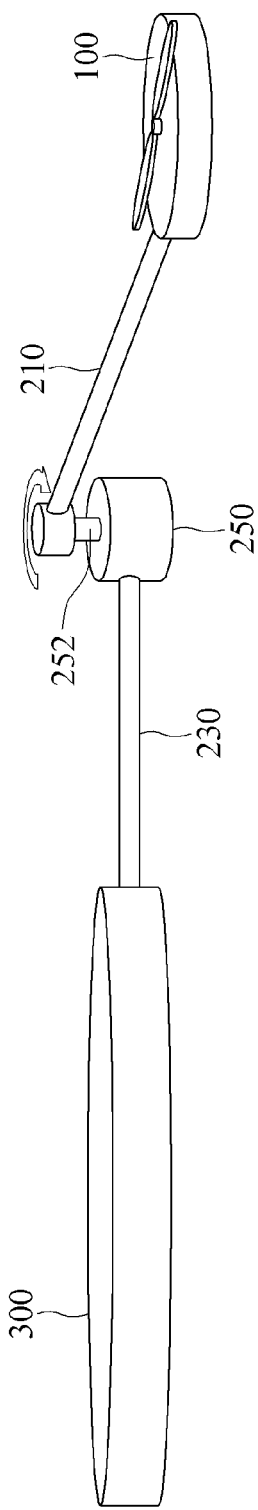

FIGS. 4a and 4b illustrate an example of a motor 250 applied as the hinge device.

Referring to FIGS. 4a and 4b, the motor 250 is provided to perform a function of the hinge device 220 illustrated in FIGS. 3a and 3b. As illustrated, the motor 250 is provided at an outer free end of the fixed support 230, and a free end of a motor shaft 252 extended upwards or downwards from the motor 250 is coupled to one end of the rotating support 210. Here, a slip ring 254 may be provided between the motor shaft 252 and the one end of the rotating support 210 as needed, such that the motor shaft 252 may be rotated at an angle of 360° without electric wires being twisted. More desirably, the motor 250 may be provided as a stepper motor or step motor. The propellers 100 are thus fixedly disposed radially at the outer end of the rotating support 210.

Through an operation of the motor 250 disposed at the outer free end of the fixed support 230, the propellers 100 may be unfolded, and thus may be freely switchable between the folded mode and the deployed mode. In addition, the propellers 100 may be unfolded at an angle in a range of 0° to 360°.

Figure 5:
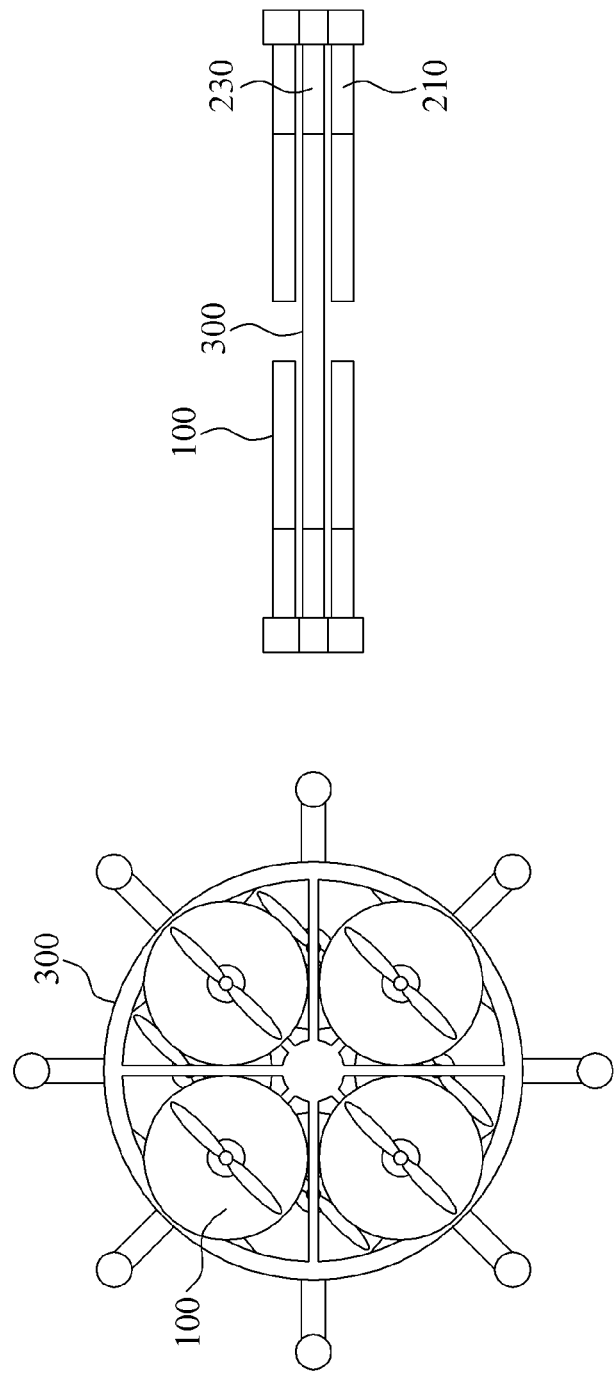
FIG. 5 is a diagram illustrating a shape of a deployment device and a shape of propellers in a folded mode of the drone of FIG. 1.

FIG. 5 is a diagram illustrating a shape of a deployment device and a shape of propellers in a folded mode of a drone according to an example embodiment described above.

As illustrated, eight propellers are provided as the propellers 100, and four propellers thereof are disposed to form a symmetry on an upper surface and a lower surface, respectively, of the platform 300. In the folded mode of the drone, all the eight propellers 100 are not unfolded, and thus a volume of the drone may be minimized That is, all rotating supports provided as the rotating support 210 are folded toward a center of the disc-shaped platform 300, or folded radially inwards, by an operation of the hinge device 220 or the motor 250, and all the eight propellers 100 are folded inwards radially from an outline of the platform 300. In such a state, an inertia moment and a torque may be minimized, and the drone may be readily stored and carried around and may also fly without baggage.

Figure 6:
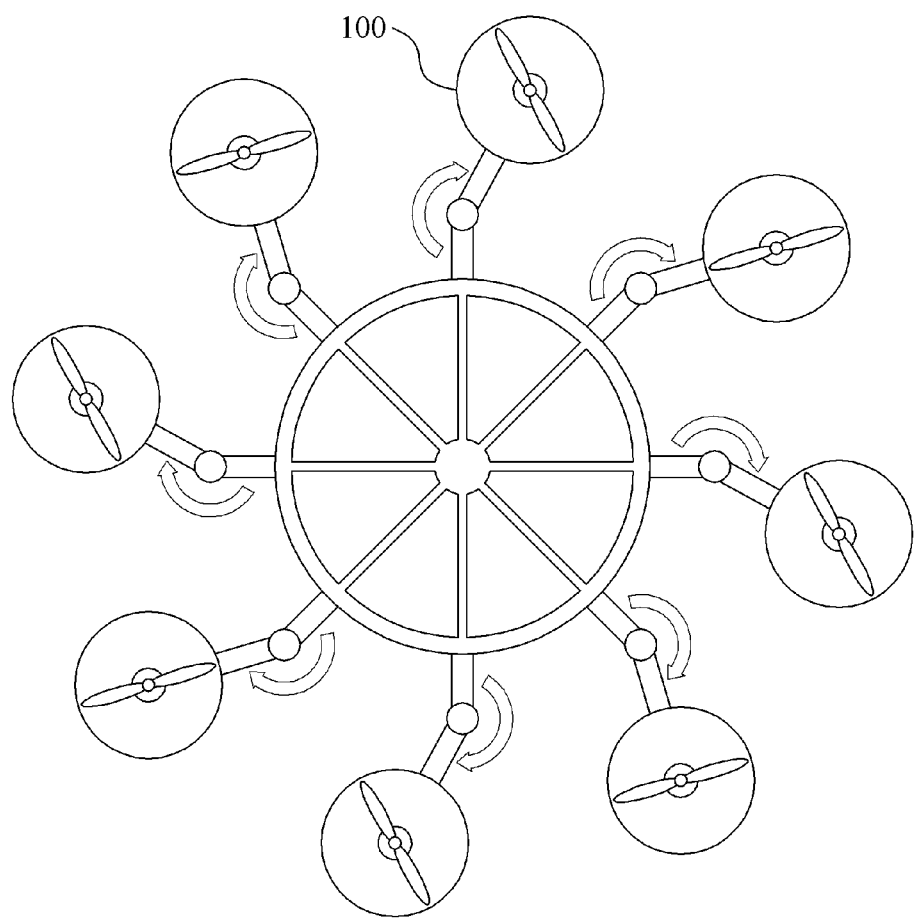
FIG. 6 is a diagram illustrating a shape of a deployment device and a shape of propellers in a deployed mode of the drone of FIG. 1.
Figure 6:
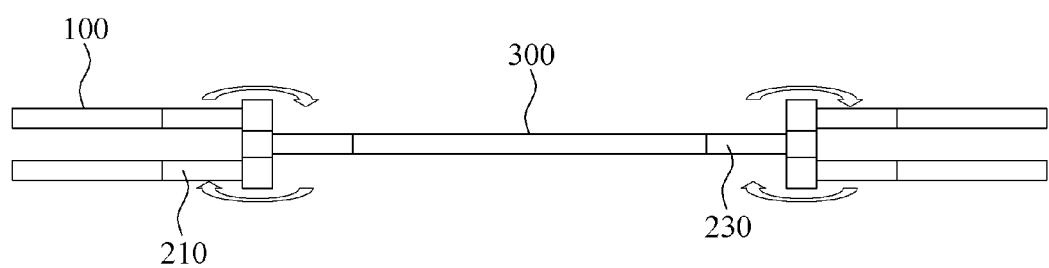

FIG. 6 is a diagram illustrating a shape of a deployment device and a shape of propellers in a deployed mode of a drone according to an example embodiment described above.

As illustrated, eight propellers are provided as the propellers 100, and four propellers thereof are disposed to form a symmetry on an upper surface and a lower surface, respectively, of the platform 300. When the propellers 100, four of which are disposed as described above, are unfolded in the deployed mode of the drone, two propellers are unfolded in pairs clockwise and counterclockwise to prevent generation of an anti-torque.

Figure 7:
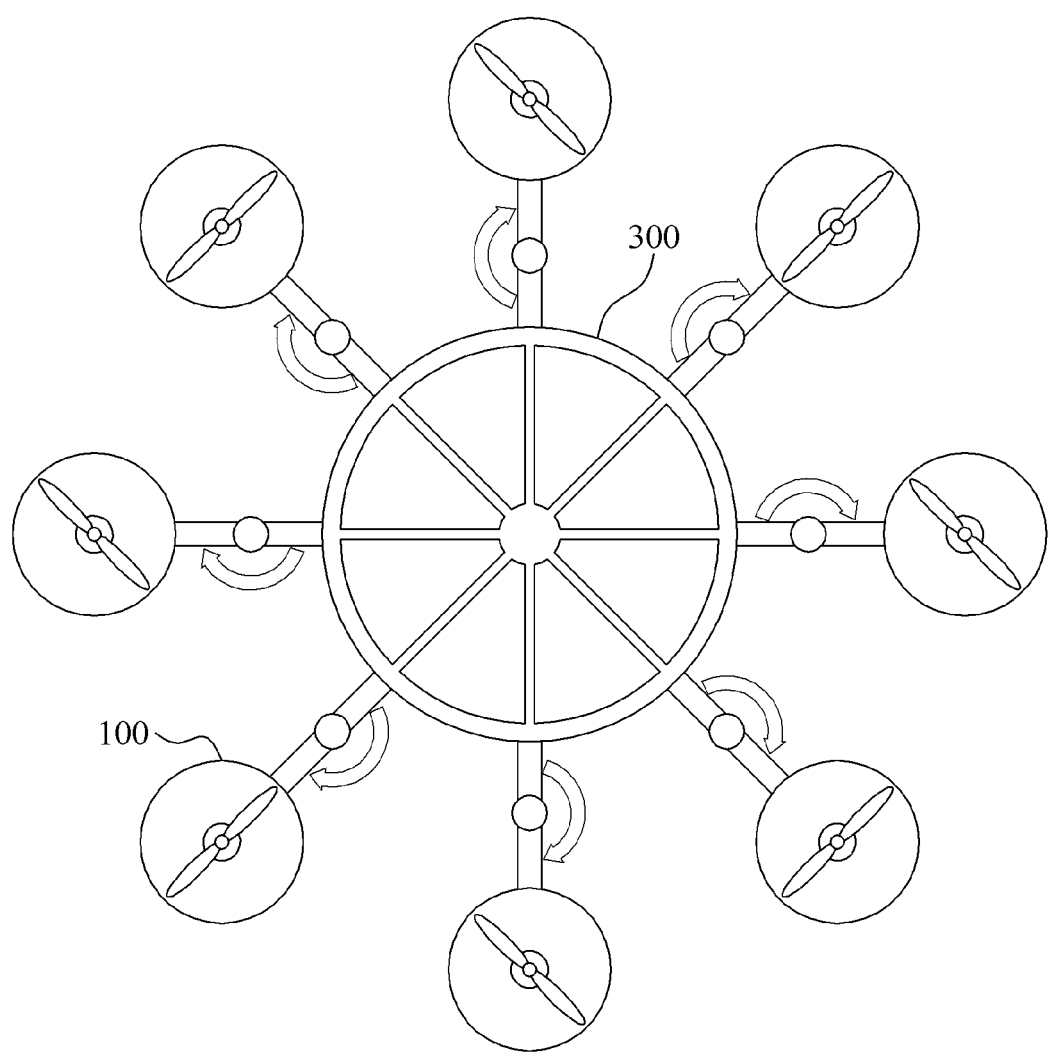
FIG. 7 is a diagram illustrating an arrangement of propellers that maximizes an inertial moment and a torque in a deployed mode of the drone of FIG. 1.

FIG. 7 is a diagram illustrating an arrangement of propellers that maximizes an inertial moment and a torque in a deployed mode of a drone according to an example embodiment described above.

As illustrated, all eight propellers 100 are fully unfolded to maximize an inertia moment and a torque in the deployed mode of the drone. That is, the fixed support 230 and the rotating support 210 are aligned in a line, and the propellers 100 attached to a free end of the rotating support 210 are unfolded to form a radial symmetry. In such a state, an inertia moment and a torque may be maximized in the deployed mode.

Figure 8A:
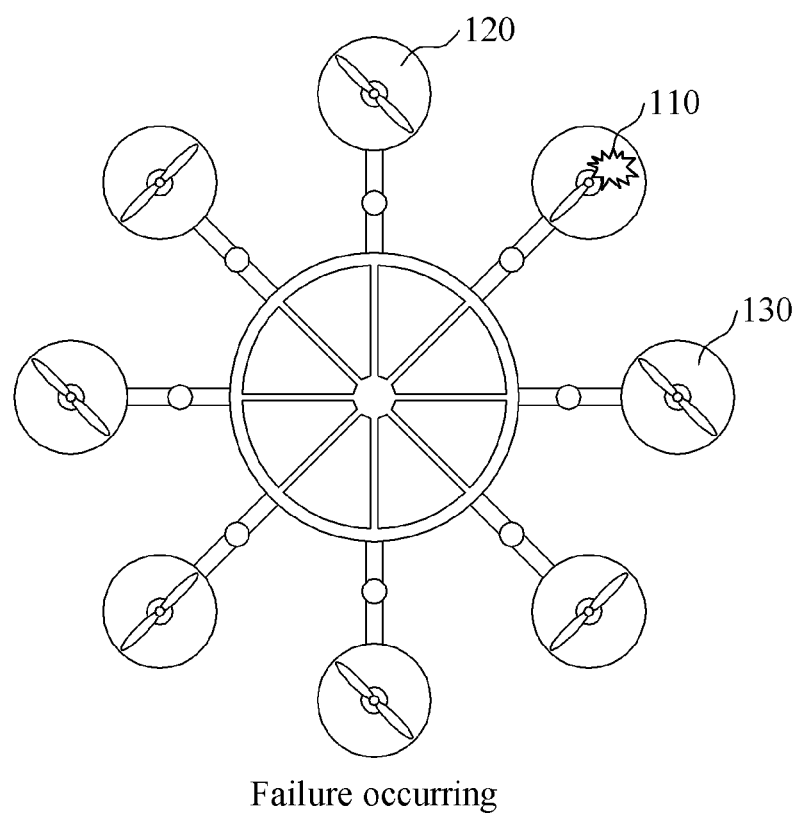
FIGS. 8a and 8b are diagrams illustrating an example of a method of recovering a failure by changing an arrangement shape of propellers when the failure occurs in a portion of the propellers of the drone of FIG. 1.
Figure 8B:
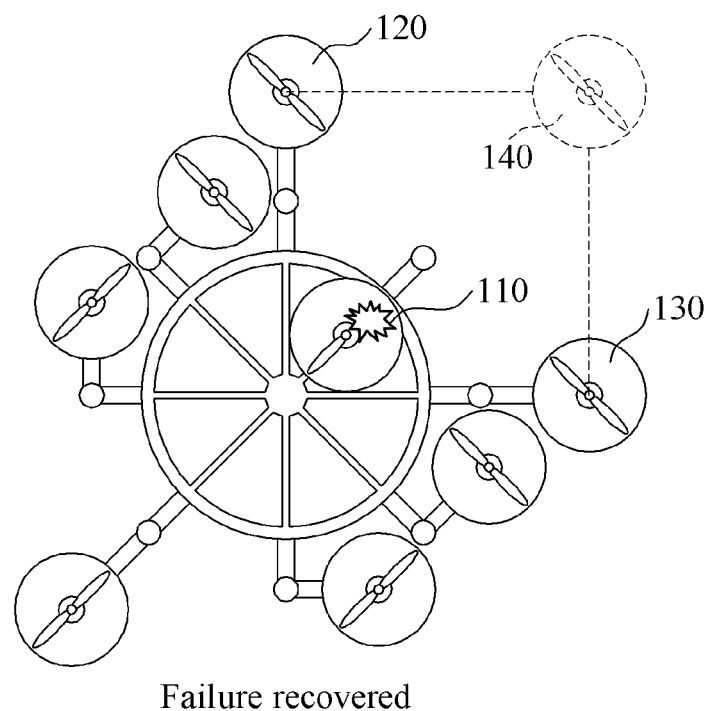
Figure 9:
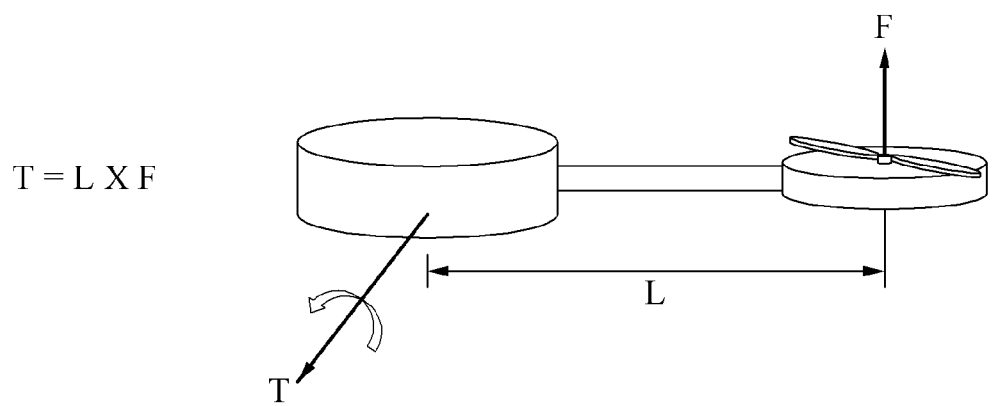
FIG. 9 is a diagram illustrating a relationship among a length of a support connecting a body and propellers of the drone of FIG. 1, a floating force of the propellers, and a torque.

FIGS. 8*a* and 8*b* are diagrams illustrating an example of a method of recovering a failure by changing an arrangement shape of propellers when a portion of the propellers of a drone is broken or a failure occurs in a portion of the propellers according to an example embodiment.

In a deployed mode of the drone, different deployment angles may be applied to the propellers 100, and thus an inertia moment and a torque may be adjusted differently based on each of a roll axis, a pitch axis, and a yaw axis of the drone. That is, it is possible to set differently a rotation starting performance for each of the roll axis, the pitch axis, and the yaw axis of the drone.

For example, when a portion of the propellers 100, for example, a propeller 110, is broken, or a failure occurs in the propeller 110, as illustrated, a deployment angle may be differently adjusted for each of normally-operating propellers in the deployed mode to maintain a posture balance of the drone. For example, as illustrated, a virtual propeller 140 is formed using a resultant force of neighboring propellers 120 and 130 disposed adjacent to the propeller 110 experiencing the failure, and then is set to be in balance with a corresponding propeller on an opposite side.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

The invention claimed is:

1. A drone comprising:
   a body;
   a platform disposed in the body;
   a deployment device disposed radially on an outer side of the platform, the deployment device including a fixed support that extends outwards radially from the outer side of the platform by a predetermined length, a rotating support coupled to an outer free end of the fixed support, and a hinge device provided to support the rotating support to be rotatably coupled to the outer free end of the fixed support;
   a propeller fixed radially at an outer end of the rotating support; and
   a landing structure integrally coupled to a lower portion of the body;
   wherein the fixed support has a length that is longer than a sum of a length of the rotating support and a length of a diameter of the propeller such that the drone is operable and flies when the propeller is folded in a folded mode of the drone.

2. The drone of claim 1, further comprising:
   a holder integrally provided on an inner lower surface of the landing structure.

3. The drone of claim 1, wherein the drone includes a plurality of the fixed support, wherein each of the plurality of fixed supports extends outwards radially from the outer side of the platform by the predetermined length and circumferentially spaced such that the fixed supports have a radial symmetry based on a center of the platform for operation stability and balance of the drone.

4. The drone of claim 3, wherein the hinge device includes a hinge and a spring portion,
   wherein the spring portion is disposed radially on an outer surface of the hinge to cover the hinge, and
   one end of the spring portion is fixed to the fixed support, and another end thereof is fixed to the rotating support.

5. The drone of claim 4, wherein a locking unit is provided on an upper surface and/or a lower surface of the platform,
   wherein the locking unit is configured to lock or release the propeller when the propeller is folded in the folded mode of the drone and disposed on the upper surface or the lower surface of the platform.

6. The drone of claim 1, wherein the drone includes a plurality of the deployment device each including at least one of the fixed support, the rotating support, and the propeller, wherein two of the plurality of propellers are designed to be unfolded in pairs in clockwise and counterclockwise directions, respectively, to prevent generation of an anti-torque when the propellers disposed radially symmetrically on an upper surface and a lower surface of the platform are unfolded during operation of the drone in a deployed mode of the drone.

7. The drone of claim 6, wherein, in response to a failure occurring in one or more of the plurality of propellers, normally-operating neighboring propellers adjacent to the one or more of the plurality of propellers experiencing the failure are designed to be folded or unfolded in pairs clockwise and counterclockwise.

8. The drone of claim 1, wherein the drone includes a plurality of the deployment device each including at least one of the fixed support, the rotating support, and the propeller, wherein the plurality of propellers are designed so that when all of the propellers in the plurality of propellers are fully unfolded such that the fixed supports and the rotating supports are aligned in a line, all of the propellers in the plurality of propellers are unfolded to be radially symmetrical with each other to maximize an inertia moment and a torque in a deployed mode of the drone.

9. The drone of claim 1, wherein the drone includes a plurality of the deployment device each including at least one of the fixed support, the rotating support, and the propeller, wherein, in response to a failure occurring in one or more of the plurality of propellers, a virtual propeller is formed using a resultant force of normally-operating neighboring propellers that are radially adjacent to the one or more of the plurality of propellers experiencing the failure, and a deployment angle is independently adjusted for each of the normally-operating neighboring propellers to allow the virtual propeller to be in balance with a corresponding propeller on an opposite side to maintain a balanced posture of the drone.

10. A drone comprising:
a body;
a platform disposed at a center of the body;
a deployment device disposed radially on an outer side of the platform, the deployment device including a fixed support that extends outwards radially from an outer surface of the platform by a predetermined length, a rotating support coupled to an outer free end of the fixed support, and a motor provided to support the rotating support to be rotatably coupled to the outer free end of the fixed support;
a propeller fixed radially at an outer end of the rotating support; and
a landing structure integrally coupled to a lower portion of the body;
wherein the drone is configured to fly when the rotating support and propeller are in a folded configuration.

11. The drone of claim 10, further comprising:
a holder integrally provided on an inner lower surface of the landing structure.

12. The drone of claim 10, wherein the fixed support extends outwards radially from the outer surface of the platform by the predetermined length such that the fixed support has a radial symmetry based on a center of the platform for operation stability and balance of the drone.

13. The drone of claim 12, wherein the motor is disposed at the outer free end of the fixed support,
wherein a free end of a motor shaft extended upwards or downwards from the motor is coupled to one end of the rotating support.

14. The drone of claim 13, wherein a slip ring is provided between the motor shaft and the one end of the rotating support.

15. The drone of claim 10, wherein the drone includes a plurality of the deployment device each including at least one of the fixed support, the rotating support, and the propeller, wherein two of the plurality of propellers are designed to be unfolded in pairs in clockwise and counterclockwise directions, respectively, to prevent generation of an anti-torque when the propellers disposed radially symmetrically on an upper surface and a lower surface of the platform are unfolded during operation of the drone in a deployed mode of the drone.

16. The drone of claim 15, wherein, in response to a failure occurring in one or more of the plurality of propellers, normally-operating neighboring propellers adjacent to the one or more of the plurality of propellers experiencing the failure are folded or unfolded in pairs clockwise and counterclockwise directions.

17. The drone of claim 10, wherein the drone includes a plurality of the deployment device each including at least one of the fixed support, the rotating support, and the propeller, wherein the plurality of propellers are designed so that when all of the propellers in the plurality of propellers are fully unfolded such that the fixed support and the rotating support are aligned in a line, all of the propellers in the plurality of propellers are unfolded to be radially symmetrical with each other to maximize an inertia moment and a torque in a deployed mode of the drone.

18. The drone of claim 10, wherein the drone includes a plurality of the deployment device each including at least one of the fixed support, the rotating support, and the propeller wherein, in response to a failure occurring in one or more of the plurality of propellers, a virtual propeller is formed using a resultant force of normally-operating neighboring propellers that are radially adjacent to the one or more propellers experiencing the failure, and a deployment angle is independently adjusted for each of the normally-operating neighboring propellers to allow the virtual propeller to be in balance with a corresponding propeller on an opposite side to maintain a balanced posture of the drone.

19. The drone of claim 10, wherein the drone includes a plurality of the deployment device, each including at least one of the fixed support, rotating support, and propeller, wherein each of the rotating supports and propellers are designed and configured to transition from a fully folded configuration to a fully unfolded configuration, the drone configured to fly when one or more of the rotating supports and propellers are in the fully folded configuration.

20. The drone of claim 19, wherein the drone is configured to fly when all of the rotating supports and propellers are in the fully folded configuration.

* * * * *